April 13, 1965 W. G. RUNYAN 3,178,635
STATIC INVERTER
Filed May 11, 1961 2 Sheets-Sheet 1

INVENTOR.
Wesley G. Runyan
BY
Robert E. Fowler
ATTORNEY

April 13, 1965   W. G. RUNYAN   3,178,635
STATIC INVERTER

Filed May 11, 1961   2 Sheets-Sheet 2

INVENTOR.
Wesley G. Runyan
BY
Robert E. Fowler
ATTORNEY

United States Patent Office 3,178,635
Patented Apr. 13, 1965

3,178,635
STATIC INVERTER
Wesley G. Runyan, Marion, Iowa, assignor to General Motors Corporation, Detroit, Mich., a corporation of Delaware
Filed May 11, 1961, Ser. No. 109,321
4 Claims. (Cl. 323—89)

This invention relates to an improved stabilizing feedback control system for multi-phase alternating current circuits particularly for those utilizing delta output connections.

In multi-phase alternating current circuits the output of each phase must be individually controlled or stabilized to maintain its output in balance with those of the other associated phases, particularly where delta output connections are used. If the amplitude of the voltage of one phase becomes higher or lower than the voltages of the other phases unwanted circulating currents are developed in the delta output circuit. However, if magnetic amplifiers are employed as components in the individual phases, the feeding back of regulatory signals will cause a phase shift in that phase and result in the further developing of unwanted circulating currents due to differences in phase in the output. If, therefore, unwanted circulating currents are to be avoided means are necessary in the regulatory feedback section to prevent any phase change caused by amplitude changes.

It is an object in making this invention to provide control means in a multi-phase alternating current power circuit such that if the amplitude of the output varies there will be applied a corrective signal of opposite sign to stabilize the circuit without in any way changing the phase thereof.

It is a further object in making this invention to provide a stabilizing feedback control circuit for an alternating current circuit which produces a variation in the signal of amplitude only and not phase.

With these and other objects in view which will become apparent as the specification proceeds, my invention will be best understood by reference to the following specification and claims and the illustrations in the accompanying drawings, in which:

Figure 1:
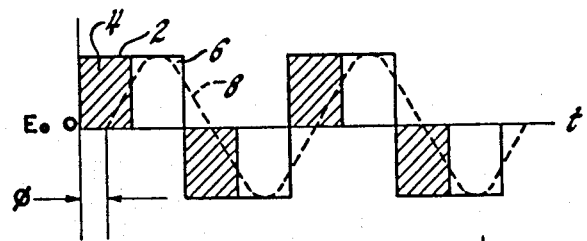
FIGS. 1 and 1a are voltage-time graphs illustrating cyclic load voltages and voltage wave forms for various circuit components.
Figure 1A:
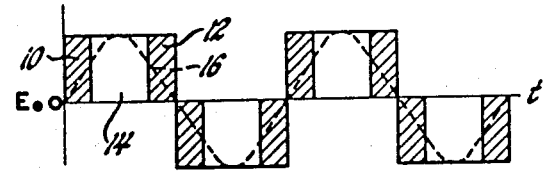

As indicated above, when using magnetic amplifiers as a part of any circuit the initial period of any single cycle of voltage is absorbed or "dropped" by the magnetic amplifier in order to saturate the core thereof. After the core is once saturated then the voltage is utilized across other components in circuit with the magnetic amplifier but this causes delays and a phase shift in the circuit. FIG. 1 illustrates what happens in such a circuit, the square wave block 2 being representative of the voltage applied across a circuit including a magnetic amplifier and other components and the first cross-hatched half 4 illustrating that portion during which the voltage is absorbed or utilized to saturate the core of the magnetic amplifier after which the second clear portion 6 of the square wave indicates that the voltage then appears across the other components in the circuit. This, however, introduces a delay of $\phi°$ in the output voltage 8 shown by the sine wave curve. In order to prevent phase shifting and the introduction of undesired effects if means could be provided for controlling saturation of cores so that it takes place at intervals at the beginning and the end of each cycle, then the main drop across the other components in circuit therewith will occur during the central portion of the cycle, then there would be no phase shift. This result is illustrated in FIG. 1a in which the saturating voltages are illustrated by the cross-hatched portions 10 and 12 of one half cycle, the central portion 14 illustrating the voltage drop across the other components. In this case the resultant output voltage 16 is still of the same configuration but is centered on each input cycle and is not phase shifted.

Figure 2:
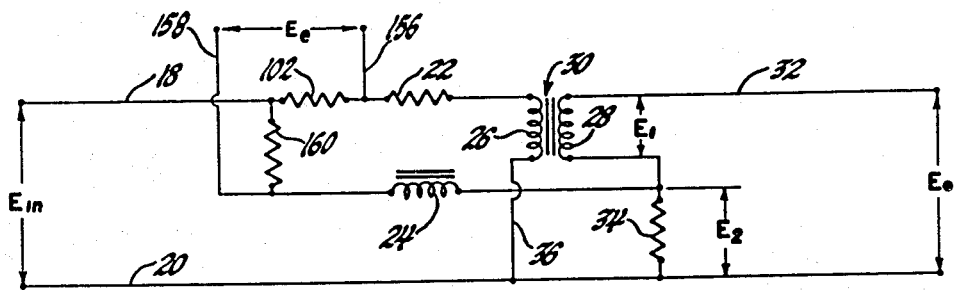
FIG. 2 is a circuit diagram showing a control circuit embodying the basic concepts of my invention.

FIG. 2 shows a simple circuit for providing such an output voltage whose R.M.S. value may be changed without changing the phase by application of an error signal $E_e$ from an A.C. feedback amplifier. In the circuit shown, an input voltage $E_{in}$, for example for a single phase line, is applied across two input lines 18 and 20. Line 18 has one terminal connected to a resistance 102 and also to a resistance 160. The remaining terminal of 102 is connected to one terminal of resistance 22 and to line 156. The remaining terminal of 160 is connected to one terminal of saturating choke 24 and to line 158. The feedback corrective error signal $E_e$ is applied across lines 156 and 158. The primary coil 26 of a saturating transformer 30 is connected through line 36 to line 20 and to the remaining terminal of resistor 22. The secondary coil 28 of the saturating transformer 30 has one terminal connected to output line 32 and the second to resistor 34 which in turn is connected to line 20. Line 20 acts as one output line also. When an error voltage $E_e$, which is either greater or less than a desired voltage in the output, is applied across the terminals 156 and 158 of this circuit it is desired that, as the amplitude of this signal increases or decreases, the width of the output signal pulse $E_0$ will vary but its phase relationship with respect to $E_{in}$ will not change. $E_e$ will be either positive or negative poled D.C. as compared to the input signal at any instant.

Figure 3:
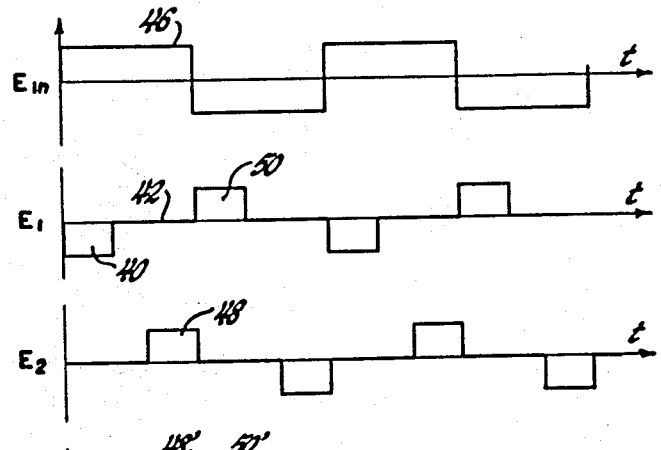
FIG. 3 is a voltage chart showing the time relationship of voltages appearing across different components of the complete circuit of FIG. 2.

To illustrate the desired result reference is made to FIG. 3 in which the wave form labeled $E_{in}$ illustrates the input signal applied to lines 18 and 20. $E_e$ between lines 156 and 158 is assumed to be zero. Also, in FIG. 3 the wave form shown at the bottom labeled $E_0$ shows the output wave consisting of two parts, $E_1$ and $E_2$ which is produced across output lines 32–20. At time zero, $E_{in}$ has a definite voltage and it is assumed that both the saturating choke 24 and the saturating transformer 30 are in a non-saturated condition. At this initial instant there is a voltage $E_1$ appearing across the secondary 28 of the transformer 30 due to the transformer action which is in the opposite sense to $E_{in}$ as shown at 40 in FIG. 3. At the same instant no voltage appears across resistance 34 in the series circuit including the choke 24 and the resistance 34 since the current has not begun to flow therethrough and the voltage is being absorbed in saturating the series choke 24. After some short period of time the transformer 30 will saturate at which instant the value of $E_1$ across the secondary will go to zero as shown by the line 42 in the graph $E_1$ in FIG. 3 but as yet there is no substantial current flow through resistor 34. $E_0$ is therefore, zero since $E_0$ is the sum of $E_1$ and $E_2$, both of which are at this instant zero, as shown at line 44 in graph $E_0$, FIG. 3. At some later time in the first positive half cycle 46 of $E_{in}$ the saturating choke 24 will saturate. This now puts the full value of $E_{in}$ across resistance 34 except for the drop across resistance 160 and produces a voltage $E_2$ as shown at 48 on the graph $E_2$ in FIG. 3. At this time $E_1$ is zero, $E_2$ has a value, and, therefore, $E_0$ has a value as shown at 48' under the graph $E_0$ which is equivalent to $E_2$.

During the next half cycle $E_{in}$ reverses and has a negative amplitude. During this time immediately a voltage $E_1$ appears across the saturating transformer 28 as shown at 50 in the opposite direction to the input voltage and this combines as shown at 50' to form with 48 a continuous pulse for $E_0$. As soon as the transformer 30 saturates, voltage $E_1$ goes to zero and since the saturating choke 24 has not saturated there is again a period of time during which no voltage appears across the output $E_0$ as indicated by the line 52. The cycle is then repeated to produce a series of alternating pulses as shown by the graph $E_0$ in FIG. 3. This occurs in the absence of any corrective signal $E_e$. If now an error signal $E_e$ is applied across 156 and 158, indicating a need for regulation the saturating transformer 30 and the saturating choke 24 will either be saturated faster or slower depending upon the direction of change i.e. what the polarity of the D.C. pulses applied to 156–158 may be and, therefore, the output pulses such as 48 and 50 will either be wider or narrower depending upon the polarity of the error voltage. The total difference, however, will be shaved or removed from the front edge and rear portion of the pulses 48 and 50, respectively, or added thereto so that the resultant combined pulses 48' and 50' will change in width but will not change in phase. This circuit, therefore, is capable of producing from an input pulse, an output signal whose RMS value may be regulated in accordance with an error signal indicating a change in said output, but whose phase remains the same.

Figure 4:
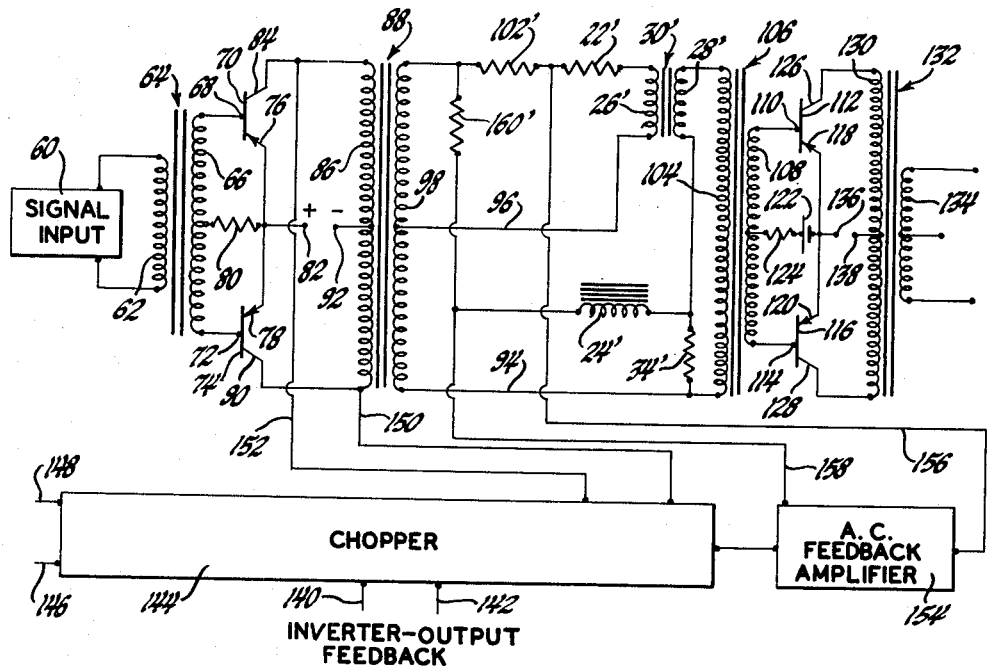
FIG. 4 is a portion of one complete phase of a multi-phase circuit embodying my invention by which the single phase currents are controlled in amplitude without any phase change.

FIG. 4 shows a complete circuit into which the illustrative control circuit has been incorporated. While FIG. 4 does not illustrate a complete single phase of a multi-phase system, it is illustrative of a major portion thereof including a signal input to the illustrated portion which would then feed a power inverter between that and the delta output connection. There is, therefore, shown a signal input 60 which might be a static inverter of some sort to apply alternating current to this particular phase. The signal input 60 is connected directly to the opposite terminals of a primary winding 62 of drive transformer 64 the secondary winding 66 of which has one terminal connected to base 68 of a transistor 70 and the other terminal connected to base 72 of a second transistor 74. The emitter electrodes 76 of transistor 70 is directly connected to emitter 78 of transistor 74 and the center tap of the transformer secondary 66 is connected through a resistance 80 to both emitters and to a power supply terminal 82. The collector electrode 84 of transistor 70 is directly connected to one terminal of primary winding 86 of a second transformer 88 and in like manner collector 90 of the transistor 74 is connected to the opposite terminal of the primary winding 86. The center tap of the winding 86 is connected to a second power terminal 92 and across the terminals 82–92 any suitable power may be applied such, for example, as 20 volts. This particular section is a switching amplifier which alternately applies signals to the transformer 88, the transistor 70 and 74 acting as switches in such alternate pulse application for input.

The second section of the phase under consideration includes the elements of the present invention and it is desired to point out that the saturating transformer 30 described in FIG. 2 is now illustrated at 30' with its primary 26' and its secondary 28'. The saturating choke 24 is similarly located to where it was in FIG. 2 and is now shown at 24' in FIG. 4. Resistance 34' is connected between one terminal of the secondary 28' and conductor 94 and primary 26' has one terminal connected through lead 96 to a center tap on secondary winding 98 of the transformer 88 and its other terminal connected through two resistances 22' and 102' in series to one end terminal of the secondary 98. Line 94 connects one terminal of the secondary 98 with one terminal of primary 104 of a third transformer 106, the remaining terminal of primary 104 being connected directly to secondary 28' of the saturating transformer. The purpose of this section is the same as that described in detail with reference to FIG. 2 and that is to take any amplified error signal from the output of this phase and regulate the output signal by changing the pulse-width depending upon changes in the amplitude of the error signal but whose pulse relation with respect to the main phase signal will not change.

Connected to the secondary 108 of the transformer 106 is a further switching amplifier section to continue to amplify the signal so that it may be used to drive a power inverter. One end terminal of the secondary winding 108 is connected to base 110 of the transistor 112 and the other end terminal in like manner to base 114 of transistor 116. The two emitter electrodes 118 and 120 of the transistors 112 and 116, respectively, are connected together and to one terminal of a biasing battery 122. The other terminal of the battery is connected through a resistance 124 to a center tap on the secondary winding 108. Collector electrodes 126 and 128 of the two transistors are connected to opposite ends of the primary winding 130 of a driver transformer 132, the secondary winding 134 of which is connected to any desirable further amplifying means. A source of power is connected across the terminals 136 and 138. The corrective signal picked up from the main output and fed back for control purposes is applied through lines 140 and 142 to a reference and chopping circuit shown in block diagram 144. This portion of the system is provided with power through input power lines 146 and 148 from any suitable source and since the feedback input signal is D.C. it is compared to the reference and the difference error signal is chopped up in the chopper supplied with a synchronizing signal through lines 150 and 152 and then applied to an A.C. feedback amplifier section shown in block diagram 154. This output is then fed from the amplifier through lines 156 and 158 to the control system previously mentioned.

The main input signals from transformer 98 are combined with the corrective synchronized signals applied through lines 156 and 158 and in the same manner as that specifically pointed out with regard to the simplified circuit shown in FIG. 2 develop square pulse output signals across lines and apply 156–158 and apply the same to the output across secondary 134 which can be called $E_0$. These would then be fed to a power inverter and then to the main three phase output.

Figure 5:
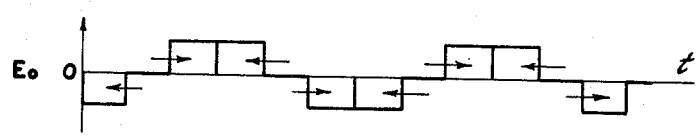
FIG. 5 is a voltage-time block diagram illustrating the voltage at the output of the circuit and indicating how its RMS value changes.

FIG. 5 illustrates in graphic form the output across secondary 134 and the arrows indicate the variations in the widths of the combined pulses when the error signal to the control section including the saturating choke 24' and the saturating transformer 30' varies in amplitude. Therefore, the output of this section to a power inverter section and thence to the output of the phase to be combined with other phases in a delta type connection can be varied for control purposes in R.M.S. or amplitude but will not change in phase.

What is claimed is:

1. In an alternating current circuit having an input and an output circuit in the latter of which it is desired to maintain a substantially constant output voltage through the use of a stabilizing feedback voltage whose amplitude and polarity may change depending upon the amount of correction necessary, a first saturable impedance means connected across said input circuit across which a voltage will be immediately developed at the beginning of each half cycle, a second saturable impedance means and a resistance means connected in series across said input circuit so that no voltage will be developed across the resistance means until said second saturable impedance means becomes saturated in each half cycle, said resistance means being connected to said first saturable imepdance, an error signal feedback circuit connected across to both the first and second saturable impedance means, said output circuit being connected across the first saturable impedance means and resistance in series and said output voltage of said alternating current circuit consisting of the sum of the voltages across the first saturable impedance and the resistance means, the R.M.S. value of which will change depending upon the amplitude and polarity of the stabilizing feedback voltage applied to the error feedback circuit since that will alter the saturation times of the first and second saturable impedance means.

2. In a control circuit for developing an output voltage which varies in R.M.S. value without changing phase from an input voltage which varies in amplitude, comprising a saturable transformer having a primary and a secondary winding, an input circuit connected to said primary winding to which an alternating current signal of variable amplitude may be applied, an output circuit, resistance means connected in series circuit relation with said transformer secondary winding across said output circuit so that the output voltage is the sum of the voltages developed across the secondary winding and that developed across the resistance means and a saturable choke impedance means connected from the input circuit to a point intermediate the resistance means and the transformer secondary winding to provide an output voltage in the output circuit, an error signal input circuit connected across both the transformer primary winding and saturable choke impedance to introduce a corrective signal to change the R.M.S. value but not changing phase as the amplitude of the input signal varies.

3. In stabilizing means for a single phase circuit of a multi-phase alternating current system having an input and an output circuit and a stabilizing feedback circuit of varying potential D.C. voltage proportional to the final A.C. output voltage, chopper means connected to said stabilizing feedback circuit to convert the D.C. feedback voltage to A.C., synchronizing means connecting the chopper means with the input circuit of the single phase circuit to synchronize the input voltage with the feedback control voltage, amplifying means connected to the output of the chopper means to amplify the A.C. control voltage, a saturable transformer connected in the single phase circuit and having a primary and a secondary winding, said primary winding being connected to said input circuit of the single phase circuit, resistance means connected in series circuit relation with said transformer secondary winding and to the output circuit of the single phase circuit, saturable choke means connected from the input circuit of the single phase circuit to a point intermediate the transformer secondary winding and the resistance means, said amplifying means being connected to the chopper also connected to the saturable choke and saturable transformer primary so that the main input voltage and the control voltages are mixed and applied to the portion including the saturable transformer and saturable choke to cause the resultant output voltages appearing across the output circuit of the single phase to vary in R.M.S. value with a change in D.C. voltage feedback but not to vary in phase as this amplitude changes.

4. In stabilizing means for a single phase circuit of a multi-phase alternating current system in which a corrective feedback signal is utilized to maintain a substantially constant output for each phase, a control network comprising a first saturable impedance means and a resistance means connected in series across the single phase circuit across which voltages are developed in sequence for each half cycle, a second saturable reactance connected to one side of the single phase circuit and to the point intermediate the first saturable reactance and the resistance to further control the development of voltage across the resistance, the output voltage across the single phase circuit beyond the network being the sum of the voltages across the first saturable reactance and the resistance, a feedback error signal connected across the first and second saturable reactances of varying polarity and amplitude to change in said first and second saturable impedance means the times necessary to saturate the same upon application of the single phase input signal, injecting delay and cutoff periods for each half cycle of the developed voltage so that the output voltage will vary in width of pulse or R.M.S. value but not vary in phase as the corrective feedback voltage varies in amplitude.

References Cited by the Examiner
UNITED STATES PATENTS

| | | | |
|---|---|---|---|
| 2,762,969 | 9/56 | Fingerett et al. | 323—89 |
| 3,019,390 | 1/62 | MacMillan | 323—121 |
| 3,102,223 | 8/63 | Burnett | 323—89 |

LLOYD McCOLLUM, *Primary Examiner.*

MILTON O. HIRSHFIELD, *Examiner.*

UNITED STATES PATENT OFFICE
CERTIFICATE OF CORRECTION

Patent No. 3,178,635                              April 13, 1965

Wesley G. Runyan

It is hereby certified that error appears in the above numbered patent requiring correction and that the said Letters Patent should read as corrected below.

Column 4, line 10, for "pulse" read -- phase --; line 46, strike out "and apply", first occurrence; line 75, strike out "to".

Signed and sealed this 24th day of August 1965.

(SEAL)
Attest:

ERNEST W. SWIDER                              EDWARD J. BRENNER
Attesting Officer                                 Commissioner of Patents